(12) United States Patent
Kemp et al.

(10) Patent No.: US 6,346,790 B1
(45) Date of Patent: Feb. 12, 2002

(54) INDUCTION MOTOR SYSTEM WITH AN INDUCTION MOTOR AND AN ELECTRICALLY ISOLATED VOLTAGE MODULATION MOTOR CONTROLLER

(75) Inventors: William Harry Kemp, Clayton; Dale Andrew Van Spengen, Smith Falls, both of (CA); Donald Morgan, Florissant, MO (US)

(73) Assignees: Emerson Electric Co., St. Louis, MO (US); Sequence Controls, Inc., Ontario (CA)

( * ) Notice: Subject to any disclaimer, the term of this patent is extended or adjusted under 35 U.S.C. 154(b) by 0 days.

(21) Appl. No.: 09/548,047

(22) Filed: Apr. 12, 2000

(51) Int. Cl.$^7$ ................................................. H02P 3/18
(52) U.S. Cl. ...................... 318/813; 318/772; 318/779; 318/781; 318/809; 318/729; 318/749; 318/767; 318/800
(58) Field of Search .................. 318/772, 779, 318/781, 809, 729, 749, 767, 800, 807, 813

(56) References Cited

U.S. PATENT DOCUMENTS 3,596,158 A * 7/1971 Watrous ..................... 318/772
5,159,255 A * 10/1992 Weber ........................ 318/775
5,734,248 A * 3/1998 Kemp et al. ................. 318/772

* cited by examiner

Primary Examiner—Karen Masih
(74) Attorney, Agent, or Firm—Harness, Dickey & Pierce, P.L.C.

(57) ABSTRACT

An induction motor system operable in a wet environment comprises an induction motor and an apparatus for controlling the speed of the motor. The motor is adapted to be coupled to an AC source for supplying an AC signal. The motor includes a rotor having rotor laminations. The reflected rotor resistance over reflected rotor reactance ratio of the motor is adjusted to be greater than one. The controlling apparatus includes a switching device, user controls, controller means and isolation means. The switching device is connected in series with the motor and is operative in either a high impedance state wherein significant current flow through the motor is prevented or a low impedance state wherein current flow through the motor is substantially undisturbed. The user controls provide motor speed input signals. The controller means receives the motor speed input signals from the user controls, and switches the switching device between its low and high impedance states in a predetermined sequence for inducing a phase angle delay in the AC signal. The isolation means electrically isolates the controller means from the AC source and includes coupling means for optically coupling the switching device to the controller means.

23 Claims, 11 Drawing Sheets

INDUCTION MOTOR SYSTEM WITH AN INDUCTION MOTOR AND AN ELECTRICALLY ISOLATED VOLTAGE MODULATION MOTOR CONTROLLER

FIELD OF THE INVENTION

The present invention relates to an induction motor system having an induction motor and a controller that employ voltage modulation to control the motor speed. More particularly, the present invention relates to such an induction motor system for use in a wet or electrically hazardous environment.

BACKGROUND OF THE INVENTION

Bathing appliances such as hot tubs and hydromassage bath fixtures are preferably designed such that the strength of water flow is adjustable, as some bathers prefer more forceful water flow than others. The flow and pressure characteristics of the centrifugal pumps used to pump the water should therefore be adjustable by the bather. It is known to control the flow and pressure characteristics of the water through the use of mechanically or electrically operated restrictors and diverter valves. Alternatively, the speed of the electric motor may be controlled.

Variable speed electric motors and controllers therefor are available and well known in the art. Known controllers generally employ mechanical speed control means, inverters, or involve voltage control of universal motors.

Mechanical speed control means typically employ gearing systems that reduce or increase the output speed of a motor shaft. Such mechanical gearing systems may be adjustable to allow the motor to be operated at various speeds.

Prior art controllers are also known that utilize an inverter to convert a DC input into a fixed step current wave form that is applied to the motor. In many cases, the cost of the inverter is greater than the cost of the motor and associated equipment, and therefore inverter technology is used primarily in high end applications. Inverter methods are exemplified in U.S. patent application Ser. No. 08/291,239 (Kemp) entitled Voltage Phase and Frequency Control by Miniature Inverter System, and in U.S. Pat. No. 4,465,961 (Landino) entitled Motor Control System.

Prior art voltage control methods vary the speed of an electric motor (typically a brush-type universal motor) by varying the AC input. The speed variation is accomplished either by varying the voltage or the phase angle of the AC input that drives the motor. Although the cost of a universal motor and a variable speed controller therefor is relatively low, the motor must rotate at a high rate of speed. Such units are therefore generally noisy and have a low life expectancy due to brush wear on the commutator shaft of the motor.

Another known system includes a three speed induction motor utilizing a standard tapped main winding to produce 3600 rpm and two alternate speeds on a two/four pole winding which produces 3600 rpm and 1800 rpm respectively. Such systems generally have limited functionality or excessive cost for the features provided.

Alternatively, an AC induction motor coupled to a variable speed motor controller may be used to drive the water pump of a hydromassage bath. Such units are effective, reliable, inexpensive, long lasting and reasonably quiet. An effective way of varying the speed of such a motor is to provide a motor controller for varying the applied voltage to the motor; for example, by inducing a phase angle delay. The motor may thus be made to reduce speed from its synchronous speed by lowering applied voltage. Lowering the applied voltage reduces the power density in the stator windings, thus reducing the magnetic flux generation in the stator windings. The lower magnetic flux reduces the torque applied to the spinning rotor, thereby reducing the speed of the motor.

An AC induction motor with a voltage modulation motor controller to control motor speed is an effective arrangement for providing an adjustable flow of water to a bather in a hydromassage bath. However, the power necessary to operate a hydromassage AC induction motor pump is sufficiently great to create a shock hazard to bathers operating controls while in the bath. Thus, the bather will be in danger of electrocution if not protected from the electric source of the motor while operating the controls to vary the flow of water. This creates a practical dilemma as the user cannot convey his commands to the pump control without "bridging" the electrical isolation barrier, putting himself at risk of shock.

Accordingly, it is an object of the present invention to provide a motor system having a variable speed AC induction motor and motor controller for driving a pump for a hydromassage bath.

It is a further object of the present invention to provide a motor system having a variable speed AC induction motor and motor controller safely operable by a bather immersed in water.

SUMMARY OF THE INVENTION

To protect the bather from electric shock, the electrical energy driving the pump is sufficiently isolated from the bather by isolating the control circuits from the electrically conductive bath water.

According to an aspect of the invention, there is provided an apparatus operable in a wet environment for controlling the speed of an induction motor adapted to be coupled to an AC source for supplying an AC signal, comprising:

a switching device coupled to the motor, the switching device being operative in either a first state wherein significant current flow through the motor is prevented or a second state wherein current flow through the motor is substantially undisturbed;

user controls for providing motor speed input signals;

controller means for receiving the motor speed input signals from the user controls, and for switching the switching device between its first and second states in a predetermined sequence for inducing a phase angle delay in the AC signal; and isolation means for electrically isolating the user controls from the AC source, wherein the isolation means includes coupling means for optically coupling the switching device to the controller means.

According to another aspect of the invention, there is provided an apparatus operable in a wet environment for controlling the speed of an induction motor adapted to be coupled to an AC source for supplying an AC signal, comprising:

a switching device connected in series with the motor, the switching device being operative in either a high impedance state wherein significant current flow through the motor is prevented or a low impedance state wherein current flow through the motor is substantially undisturbed;

user controls for providing motor speed input signals;

controller means for receiving the motor speed input signals from the user controls, and for switching the switching device between its low and high impedance states in a predetermined sequence for inducing a phase angle delay in the AC signal; and isolation means for electrically isolating the controller means from the AC source, wherein the isolation means includes coupling means for optically coupling the switching device to the controller means.

According to another aspect of the invention, there is further provided a method for controlling the speed of an induction motor in a wet environment adapted to be coupled to an AC source for supplying an AC signal, and comprising:

a switching device coupled to the motor, the switching device being operative in either a first state wherein significant current flow through the motor is prevented or a second state wherein current flow through the motor is substantially undisturbed;

user controls for providing motor speed input signals;

controller means for receiving the motor speed input signals from the user controls, and for switching the switching device between its first and second states in a predetermined sequence for inducing a phase angle delay in the AC signal; and isolation means for electrically isolating the user controls from the AC source, wherein the isolation means includes coupling means for optically coupling the switching device to the controller means;

the method comprising the steps of:
(a) at a zero-crossing point of the positive half cycle of the AC signal, switching the switching device to its first state;
(b) generating a first delay;
(c) switching the switching device to its second state;
(d) at a zero-crossing point of the negative half cycle of the AC signal, switching the switching device to its first state;
(e) generating a second delay;
(f) switching the switching device to its second state.

According to another aspect of the invention, there is further provided a method for controlling the speed of an induction motor adapted to be coupled to an AC source for supplying an AC signal, and comprising:

a switching device connected in series with the motor, the switching device being operative in either a high impedance state wherein significant current flow through the motor is prevented or a low impedance state wherein current flow through the motor is substantially undisturbed;

user controls for providing motor speed input signals;

controller means for receiving the motor speed input signals from the user controls, and for switching the switching device between its low and high impedance states in a predetermined sequence for inducing a phase angle delay in the AC signal; and isolation means for electrically isolating the controller means from the AC source, wherein the isolation means includes coupling means for optically coupling the switching device to the controller means;

the method comprising the steps of:
(a) at a zero-crossing point of the positive half cycle of the AC signal, switching the switching device to its high impedance state;
(b) generating a first delay;
(c) switching the switching device to its low impedance state;
(d) at a zero-crossing point of the negative half cycle of the AC signal, switching the switching device to its high impedance state;
(e) generating a second delay;
(f) switching the switching device to its low impedance state.

According to another aspect of the present invention, there is further provided an induction motor adapted to be coupled to an AC source and a motor controlling apparatus for controlling the motor speed by varying voltage phases supplied to the motor from the AC source, the motor comprising:

a motor drive shaft;

a rotor mounted on the motor drive shaft, the rotor having rotor laminations on its outer surface, the rotor laminations having a plurality of conductor bar slots and having a reflected rotor resistance over reflected rotor reactance ratio that is greater than one;

conductor bars accommodated in the conductor bar slots;

end rings for short-circuiting the conductor bars to form a rotor winding;

stator windings adapted for providing rotational forces to the rotor in cooperation with the rotor winding; and a stator for supporting the stator windings.

According to yet another aspect of the present invention, there is further provided an induction motor system operable in a wet environment, the system comprising: an induction motor adapted to be coupled to an AC source for supplying an AC signal, the motor having:

a motor drive shaft;

a rotor mounted on the motor drive shaft, the rotor having rotor laminations on its outer surface, the rotor laminations having a plurality of conductor bar slots and having a reflected rotor resistance over reflected rotor reactance ratio that is greater than one;

conductor bars accommodated in the conductor bar slots;

end rings for short-circuiting the conductor bars to form a rotor winding;

stator windings adapted for providing rotational forces to the rotor in cooperation with the rotor winding; and a stator for supporting the stator windings; and a motor controlling apparatus for controlling the speed of the motor, the controlling apparatus having:

a switching device coupled to the motor, the switching device being operative in either a first state wherein significant current flow through the motor is prevented or a second state wherein current flow through the motor is substantially undisturbed;

user controls for providing motor speed input signals;

controller means for receiving the motor speed input signals from the user controls, and for switching the switching device between its first and second states in a predetermined sequence for inducing a phase angle delay in the AC signal; and isolation means for electrically isolating the user controls from the AC source, the isolation means including coupling means for optically coupling the switching device to the controller means.

BRIEF DESCRIPTION OF THE DRAWINGS

Embodiments of the invention will now be described in the accompanying drawings, in which:

FIG. 3A is a schematic of an alternate construction of a switching element of the Schematic shown in FIG. 3, using thyristors instead of a triac;

With respect to the above drawings, similar references are used in different Figures to denote similar components.

DETAILED DESCRIPTION OF THE INVENTION

One common type of prior art variable speed motor that employs the voltage control method is a split phase capacitor motor, or permanent split capacitor motor, which is known in the art as a PSC motor. PSC motors are typically employed in small load applications which do not require high start/running torque.

Permanent split capacitor (PSC) motors are the best choice for operating in the "slip" region of speed control. In the PSC motor, starting torque is generated by insertion of a capacitor in series with an auxiliary winding, displaced a number of mechanical degrees from the main running winding. When AC voltage is applied to both windings simultaneously, the current will build faster in the capacitor/auxiliary winding and provide a phase shift from that induced in the main winding. The effect is rotational magnetic energy imparted on the rotor.

The capacitor value is selected to provide adequate starting torque while limiting motor efficiency losses at running speed.

PSC motors are ideal for operation by voltage adjustment for several reasons known to those skilled in the art. One reason is that many PSC motors have no starting switch. Another reason is that PSC motors are often used in applications where a small change in load speed causes a large change in load output. For example, lowering the speed of a fan will cause an exponential decrease in fan output. Many small PSC motors operating fans are speed controlled by the insertion of a simple "light dimmer switch", which operates on the basis of phase angle delay of the applied AC mains voltage.

Figure 1:
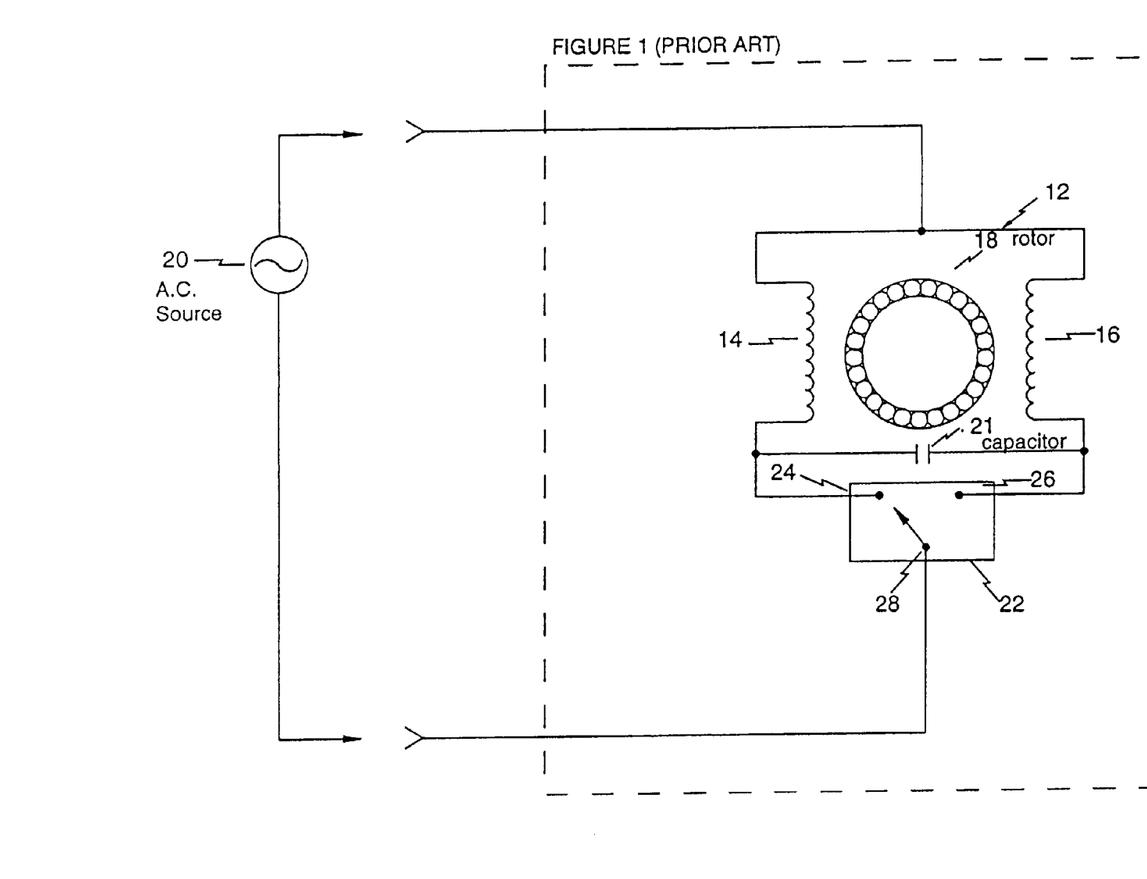
FIG. 1 is a schematic of a prior art PSC motor.

Referring to FIG. 1, there is shown an embodiment of a prior art PSC motor 12. The motor 12 includes two stator windings 14, 16 and a rotor 18. Both windings 14, 16 may be of equal inductance and resistance, which makes them both "running" windings. One side of each of the windings 14, 16 is coupled to one side of an AC source 20, while a capacitor 21 is coupled across the other side of the windings 14, 16. A switch 22 is also included in the assembly. The switch 22 includes two output terminals 24, 26 and an input terminal 28. Each of the two output terminals 24, 26 is coupled to one side of the capacitor 21, while the input terminal 28 is coupled to the other side of the AC source 20.

The switch 22 being placed in the position as shown applies the AC source 20 to the motor 12 and also places the capacitor 21 in series with winding 16. This causes the AC source 20 to be applied across both of the windings 14, 16. The capacitor 21 induces a phase shift between the voltages across each of the windings 14, 16. The phase shift creates a pseudo two phase voltage across the windings 14, 16. The two phase voltage generates a rotating magnetic field within the motor 12 that provides the necessary torque to start turning the rotor 18. If the capacitor 21 was taken out of the circuit, the motor 12 would not start because there would be no rotating magnetic field to generate the necessary torque to start turning the rotor 18.

If the switch 22 were placed in the position where input terminal 28 were coupled to output terminal 26, the capacitor 21 would be placed in series with winding 14. This position of the switch 22 enables the direction of the motor 12 to be reversed.

The value of the capacitor 21 is selected to provide a large enough "start current" to start the rotor 18 rotating. The capacitor 21 must also be of a value sufficient to supply an optimum "running current", which ensures the motor 12 runs efficiently at full speed. This can be a problem because very often no one capacitor can supply both currents. The amount of "start current" required is often large, which potentially can damage the motor 12 when running at full speed. In order to overcome this problem, a second capacitor can be placed in parallel with capacitor 21, as shown in FIG. 2.

Figure 2:
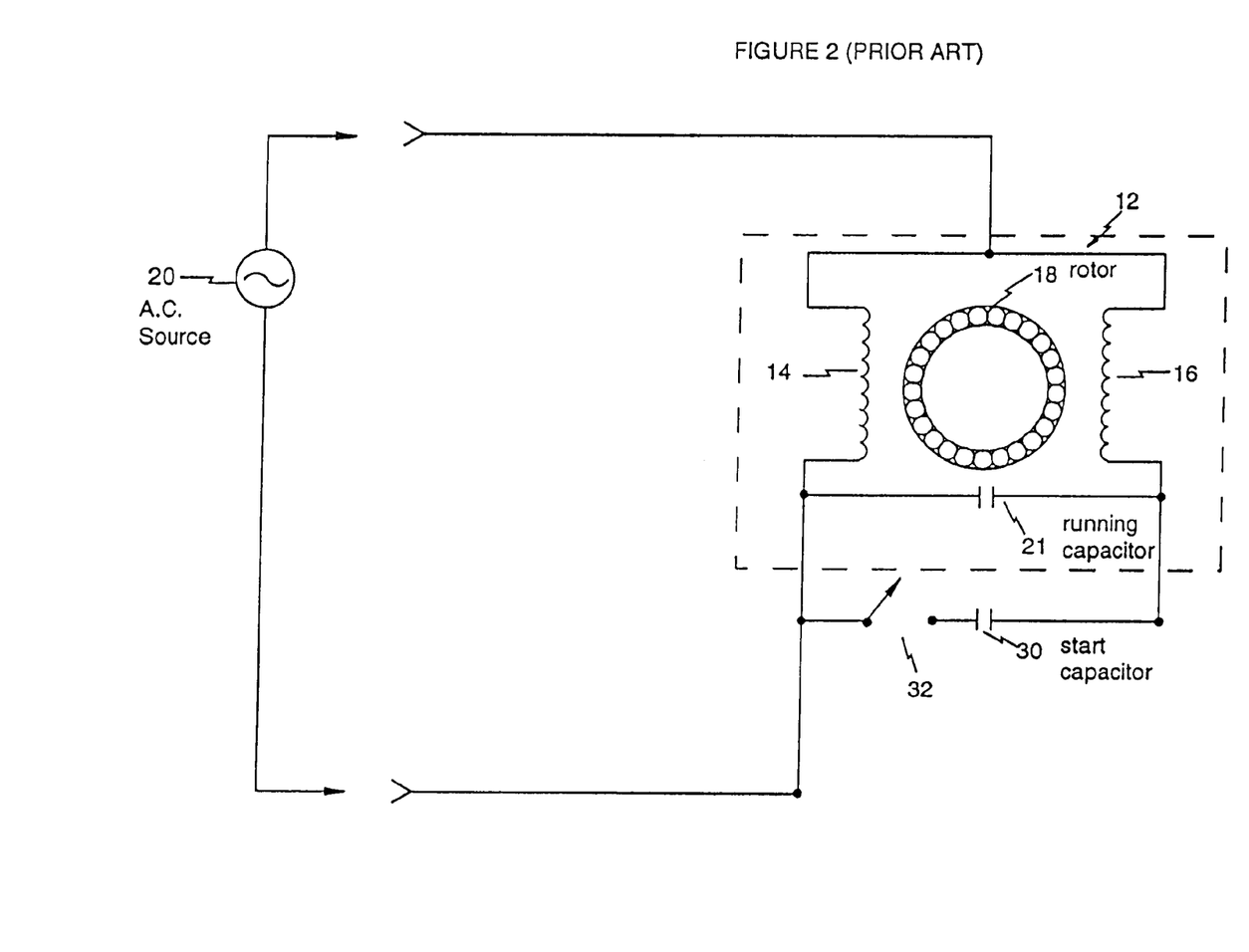
FIG. 2 is a schematic of a prior art PSC motor with dual capacitors.

Referring to FIG. 2, there is shown a second embodiment of the prior art PSC motor 12. In this embodiment, the motor 12 includes a running capacitor 21 coupled across a series coupled centrifugal switch 32 and start capacitor 30. When the motor 12 is starting, the switch 32 is closed, thus placing the running capacitor 21 and start capacitor 30 in parallel. Such a configuration allows the motor 12 to receive a high starting current and torque when the AC input 20 is applied. Once the motor 12 nears operational speed, the centrifugal switch 32 opens, removing the start capacitor 30. At this time the running capacitor 21 is left in the circuit providing an optimum "running current" that will not damage the motor 12.

There are several problems associated with prior art PSC motor controllers. A first set of problems relates to the use of capacitors and switches. These components increase the cost and weight of the motors. In addition, capacitors and centrifugal switches render the design of a speed controller for the motors more difficult, as the designer must work within the limits imposed by the capacitors or the centrifugal switch.

A second set of problems associated with prior art PSC motor controllers relates to the speed control thereof. The speed of a PSC motor may be controlled by varying applied voltage, i.e. by varying the phase angle applied to the two motor windings. The speed of the motor can be reduced below the synchronous speed by varying the slip factor, i.e. an increased slip factor will reduce the speed of the motor.

The slip factor (and therefore the motor speed) may be varied through the use of switch selected "taps" of an external autotransformer, by taps internal to the stator windings, or by phase angle delay of the applied power. Although an induction motor develops torque at any rotor speed less than the synchronous speed, such motors must normally operate (except during starting or for short intervals) within a limited "slip range". The fact that the motor must be run within a limited slip range is another disadvantage of prior art PSC motors.

The above problems associated with PSC motors are addressed in U.S. Pat. No. 5,734,248 (Kemp et al.) issued Mar. 31, 1998 and entitled Current Modulation Motor Controller, wherein the subject controller eliminates the use of capacitors and centrifugal switches. The subject controller also provides for a wider phase angle difference by varying independently the phase of both of the windings with respect to the AC input, thus providing a wider slip range which enables the motor to run at a greater range of speed. The technology described in said patent improves on the phase angle control of prior art PSC motors by utilizing electronic conduction means and delay circuits to create the phase delay of a starting capacitor.

Another problem associated with prior art PSC motors relates to their use to drive a pump for a hot tub or hydromassage bath. It is desirable for the bather, while immersed in water, to be able to control the flow of water by varying the speed of the motor. To avoid the risk of electrocution, the motor controller must be designed and installed such that the electricity driving the motor does not come into contact with the bather. A common method of protecting the bather from electrocution is to place the control switch for the pump a sufficient distance from the bath so that the bather must leave the bath in order to adjust the speed of the motor. While this simple technique is effective at protecting the bather from electrocution, it is inconvenient for bathers to have to leave the bath. It would therefore be advantageous for to have a motor controller for varying the speed of the PSC motor that is safely operable by a bather immersed in water. This is accomplished by the present invention by sufficiently electrically isolating the user controls of the motor controller from the electricity powering the PSC motor.

Figure 3:
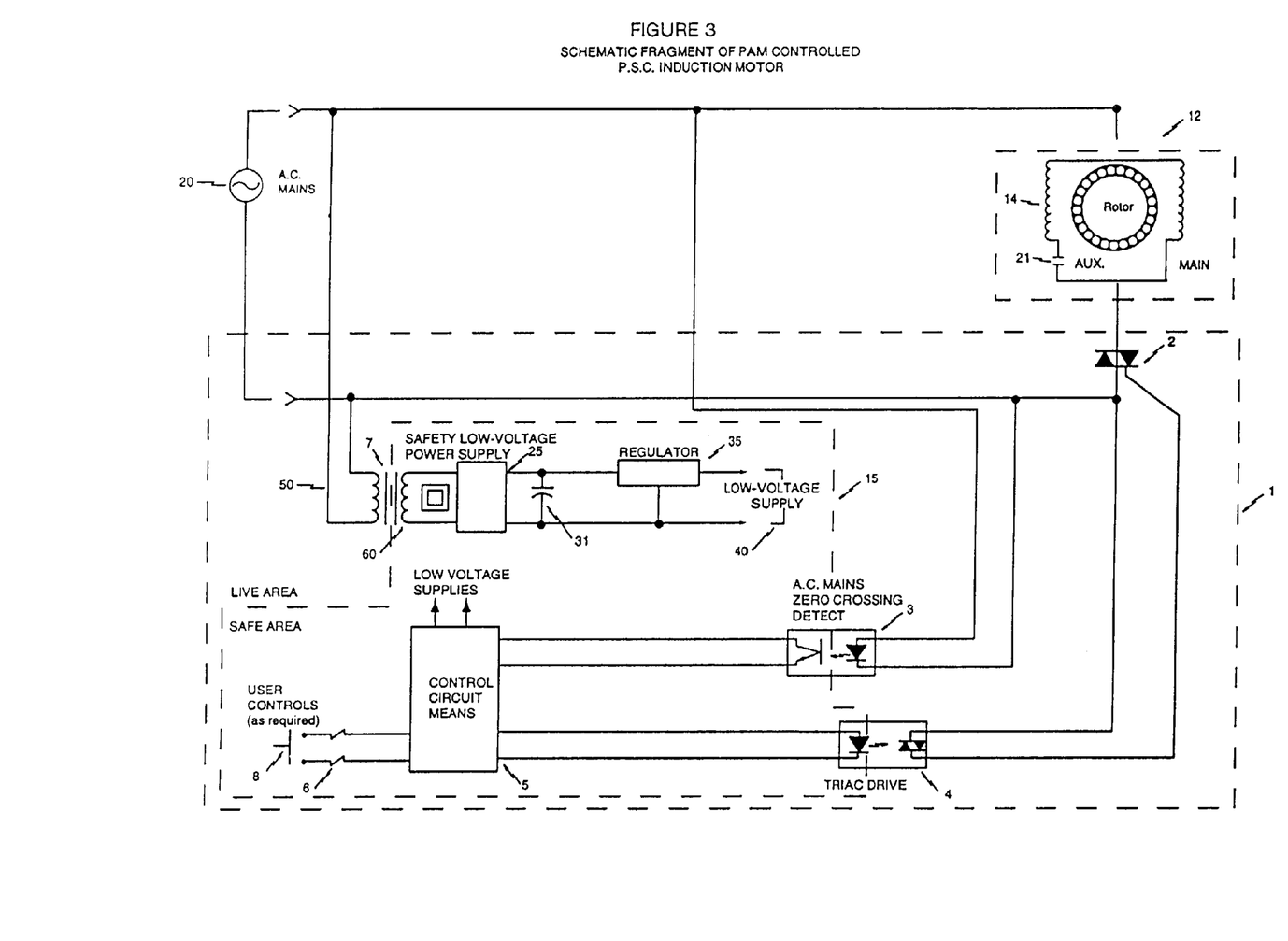
FIG. 3 is a schematic of one embodiment of the present invention.

FIG. 3 illustrates an embodiment of an induction motor system in accordance with the present invention which comprises a PSC induction motor 12 and a phase angle modulation motor controller 1. The motor controller 1 is connected to the motor 12 and an AC source 20.

Motor controller 1 includes a triac device 2 connected to the PSC motor 12. Triac device 2 is connected to optically coupled triac driver 4. Optically coupled triac driver 4 is connected to controller 5. AC source 20 is coupled to optically coupled receiver and AC source zero crossing detector 3. Optically coupled receiver and AC source zero crossing detector 3 is coupled to controller 5.

A suitable item for controller 5 is a microcontroller integrated circuit. One preferred microcontroller is the PIC 16C54 device operating at a crystal frequency of 4 Mhz. Such an arrangement of crystal and microcontroller will provide for the orderly processing of input stimuli received from user controls 8, and output control to attached peripheral devices such as optically coupled receiver and AC source zero crossing detector 3 and optically coupled triac driver 4. The orderly processing of such inputs and outputs are completed by execution of the flowchart patterns shown in FIGS. 4 and 6. A person skilled in the art will be familiar with microcontrollers such as the PIC 16C54.

AC source 20 is connected to step-down transformer 7 having input winding 50 and output winding 60. The transformer 7 must have the characteristic that it ceases operation under abnormal operating conditions without bridging the primary to secondary circuits. That is, if the transformer 7 ceases operation, the integrity of the insulation barrier between the input winding 50 and output winding 60 must remain intact. Such transformers are known in the art.

Output winding 60 is connected to full wave bridge rectifier 25. Bridge rectifier 25 is connected to smoothing capacitor 31. Smoothing capacitor 31 is connected to voltage regulator 35. Output of voltage regulator 35 is provided as logic voltages 40 and connected to a controller 5 and other locations in the circuit, as would be apparent to those skilled in the art.

User controls 8 is connected to impedance protection resistors 6, which are in turn connected to controller 5.

Components lying outside the safe area 15 of the motor controller 1 are either directly or indirectly connected to the AC source 20. A person touching a component outside the safe area 15 and who is in contact with "earth" return will be subject to electrocution hazard and possible death. Therefore, the devices directly connected to the AC source 20 constitute a shock hazard to a bather immersed in water, due to the high conductivity of water and the desire of high-voltage electrical energy to return to "earth" potential in the event of insulation system failure.

To eliminate the risk of electric shock to the bather, all electrical paths between AC source 20 and user controls 8 must be sufficiently insulated. That is, all paths of high voltage, ground referenced energy leakage must be sufficiently blocked from reaching the bather. In the illustrated embodiment, there are three paths where high voltage AC source 20 may "conductively bridge" to the low voltage paths: (a) through the power supply step-down transformer 7, (b) through the AC source zero crossing detector 3, and (c) through optically coupled triac driver 4. To effectively isolate user controls 8 from AC source 20, each path between the two potentials must be designed such that the insulating properties of the transformer 7, AC source zero crossing detector 3 and optically coupled triac driver 4 respectively will remain intact should the component fail.

As described above, the AC source 20 connects with the logic circuits in three places. The transformer 7 must be of sufficient capacity to operate the logic circuits. The transformer 7 must have the ability to cease operation under abnormal operating conditions without bridging the input winding 50 and output winding 60. Such transformers are known in the art.

A relay with isolated coil and contacts may be used to provide the isolation from the control to motor drive voltages. However, since the illustrated embodiment requires phase angle control of the PSC motor 12, the triac 2 is inserted in the motor drive voltage.

Control signals for triac 2 are communicated by optically coupled triac driver 4 from controller 5. To communicate control signals between the controller 5 and triac 2, without causing a shock hazard to the user when touching user controls 8, an optically coupled triac driver 4 is utilized.

Similarly, an optically coupled receiver and AC source zero crossing detector 3 is connected to AC source 20 to monitor the modulation of the AC source 20 and provide an isolated "image" of it to the controller 5.

Utilizing the above circuit construction techniques, the bather is sufficiently "removed" from the high voltage AC source 20 so that no shock hazard is present. The user controls 8 may thus be safely operated by the bather to start stop or vary the speed of the motor.

Figure 4:
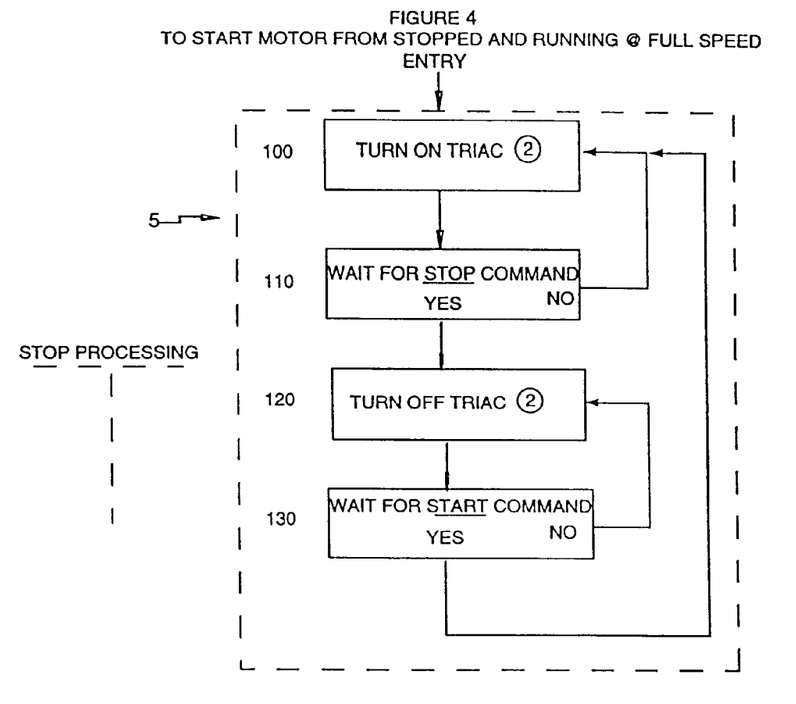
FIG. 4 is a flow chart illustrating the starting mode sequence and full speed mode sequence of the controller of the embodiment of FIG. 3.

Referring to FIG. 4, a flow chart of the starting mode of operation of the controller 5 is shown. The entry point TURN ON TRIAC 100 will cause the controller 5 to enable optically coupled triac driver 4, which will cause triac 2 to enter full conduction. The controller 5, will advance to step WAIT FOR STOP COMMAND 110. If no stop command is pending from user controls 8, the controller 5 will loop at step TURN ON TRIAC 100.

Figure 5:
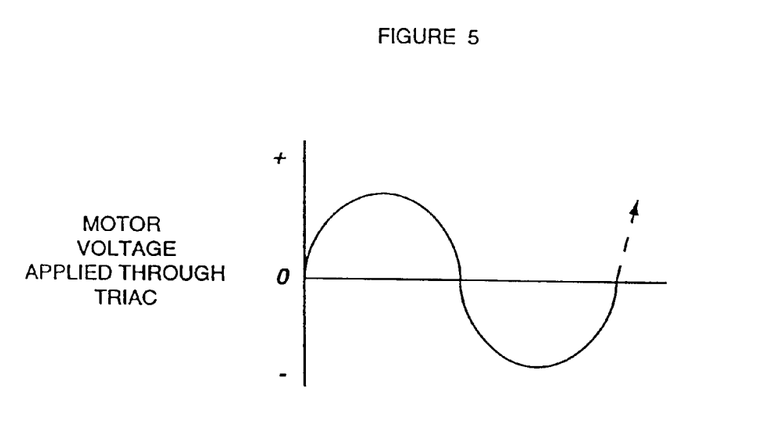
FIG. 5 is a wave form diagram of the voltage signal across the motor windings of the embodiment of FIG. 3 when in the starting mode and full speed mode.

The net result will be AC mains voltage applied to the motor for the full 360 degree conduction cycle of AC source 20. The voltage wave form of motor 12 is shown in FIG. 5.

If a user requested stop command is received as input from user controls 8, the controller 5 will advance to step TURN OFF TRIAC 120. The controller 5, will advance to step WAIT FOR START COMMAND 130. If no start command is pending from user controls 8, the controller 5 will loop at step TURN OFF TRIAC 120.

If a user start command is pending from user controls 8, the controller 5, will advance from step WAIT FOR START COMMAND 130 and branch to step TURN ON TRIAC 100, as described above.

Figure 6:
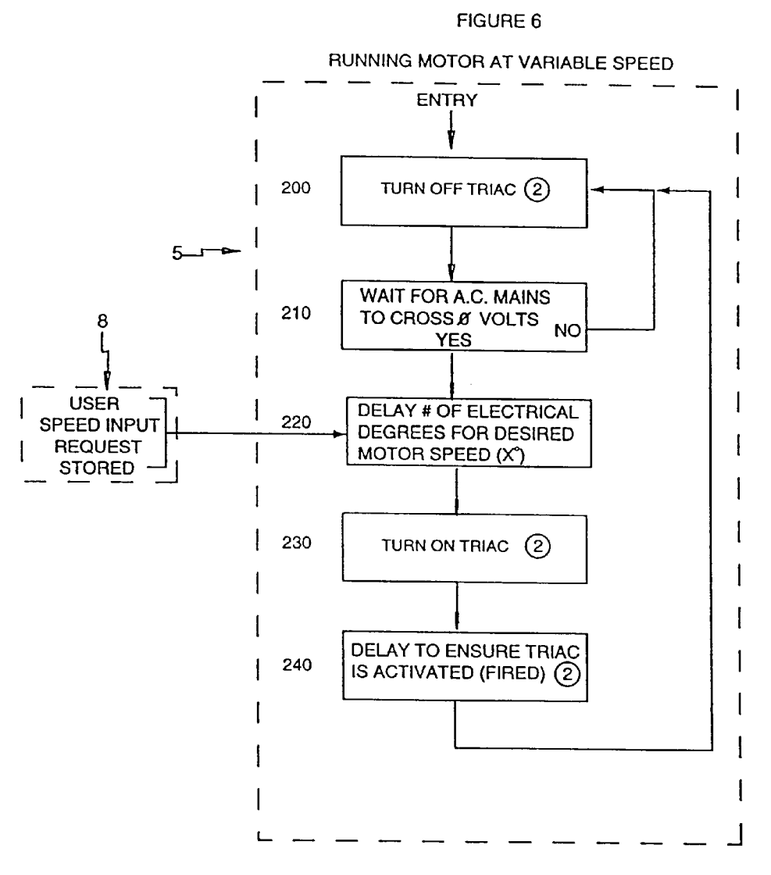
FIG. 6 is a flow chart illustrating the variable speed mode sequence of the controller of the embodiment of FIG. 3.

Referring now to FIG. 6, there is shown a flow chart diagram of running the motor 12 at variable speed. Upon entry to this flow chart, controller 5 will perform step TURN OFF TRIAC 200. The controller 5 will advance to step WAIT FOR AC SOURCE TO CROSS 0 VOLTS 210. Controller 5 will accomplish this step by monitoring the "image" voltage of the AC source 20, through optically coupled receiver and AC source zero crossing detector 3 as described above. If no zero crossing condition is detected at step 210, controller 5 will loop at step TURN OFF TRIAC 200.

At zero crossing condition, controller 5 will advance to step DELAY # OF ELECTRICAL DEGREES FOR DESIRED MOTOR SPEED 220. Step 220 relates user speed setting requests 250 which are received as input from user controls 8, into a time delay expressed in electrical degrees. A reader skilled in the art will understand that there is an empirical relationship for each motor 12, between a required speed and a phase delay of AC source 20.

After completing the delay calculated in step 220, controller 5 advances to step TURN ON TRIAC 230. Controller 5 will advance to step DELAY TO ENSURE TRIAC IS ACTIVATED (FIRED) 240. Step 240 ensures that sufficient current is passing through triac 2, to ensure it remains in conduction until the next AC source 20 zero crossing.

Figure 7:
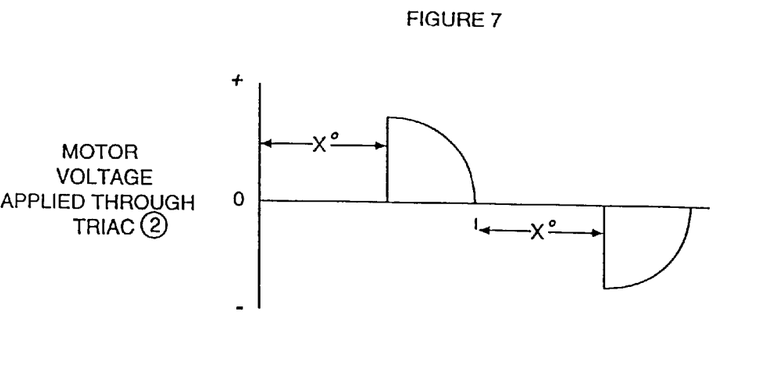
FIG. 7 is a wave form diagram of the voltage signal across the motor windings of the embodiment of FIG. 3 when in the variable speed mode of the present invention.

A reader skilled in the art will understand that a triac will stay in conduction only so long as a voltage is expressed across it. By execution of the steps described in FIG. 6, the voltage shown in FIG. 7 will be developed across motor 1, with a time delay equal to "X" electrical degrees. The period of "X" time delay is determined by previous experimentation in relationship to the users requested speed setting.

In the above embodiments, a triac is used for switching. However, a thyristor arrangement may be also used.

Each motor design determines the value of the reflected rotor resistance over the reflected rotor reactance. This ratio is known as the R2/X ratio. The governing factor of this ratio is a trade-off between efficiency and magnetic slip, i.e., speed, performance. The R2/X ratio is normally less than one for typical PSC motors of the prior art.

In order to make a PSC motor operate with phase controlled voltage for variable speed with a variable torque load for, e.g., a hot tub or hydromassage centrifugal bath pump, the R2/X ratio needs to be altered from typical PSC designs.

To this end, the present invention uses a rotor having rotor laminations. The rotor laminations have a less conductor bar slot area as compared with typical rotor laminations used in typical PSC motors. That is, each conductor bar slot is narrowed and the rotor resistance is increased. This causes an intentional loss in operating speed. Thus, the motor speed torque curve can be altered. The motor may also use more resistive end rings than typical end rings, which provides a further loss in operating speed.

Figure 8:
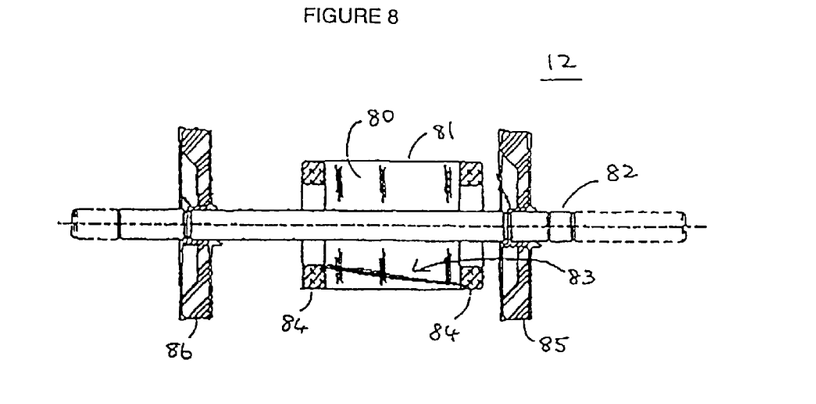
FIG. 8 is a partial cross sectional view of an embodiment of the motor shown in FIG. 3.

Referring to FIG. 8, an embodiment of the motor 12 using a rotor 80 which comprises multiple rotor laminations 81. The rotor laminations 81 are mounted on a motor shaft 82. The rotor laminations 81 are provided with a plurality of conductor bar slots for accommodating conductor bars. An example of a conductor bar slot 83 is shown in FIG. 8 as it is visible on the outer surface of the rotor laminations 81. At the ends of the rotor laminations 81, end rings 84 are provided to short-circuit the conductor bars embedded in the conductor bar slots 83 to form a rotor winding. A fan 85 is provided on the motor shaft 82 to cool the other parts of the motor 12. Stator windings and a stator are not shown for simplicity of the drawing. The above elements are usually provided in a motor frame or housing (not shown).

According to the present invention, for a 115 volt motor, the R2/X ratio is adjusted to be greater than one to provide a performance curve desired for a pump load for, e.g., a hot tub or hydromassage centrifugal bath.

This R2/X ratio is achieved by using rotor laminations 81 which have the conductor bar slot area of 45% less than typical rotor laminations. Also, the rotor laminations 81 have the end rings which are two to three times more resistive as compared with typical end rings.

Typical rotor laminations of the prior art have a conductor bar slot area of 0.04378 square inches. Thus, the rotor laminations 81 of the present invention have a conductor bar slot area of 0.02944 square inches.

Also, typical end rings of the prior art have a resistance of 3.5 Ohms. Accordingly, the end rings used in the present invention have a resistance of 10 Ohms.

Figure 9:
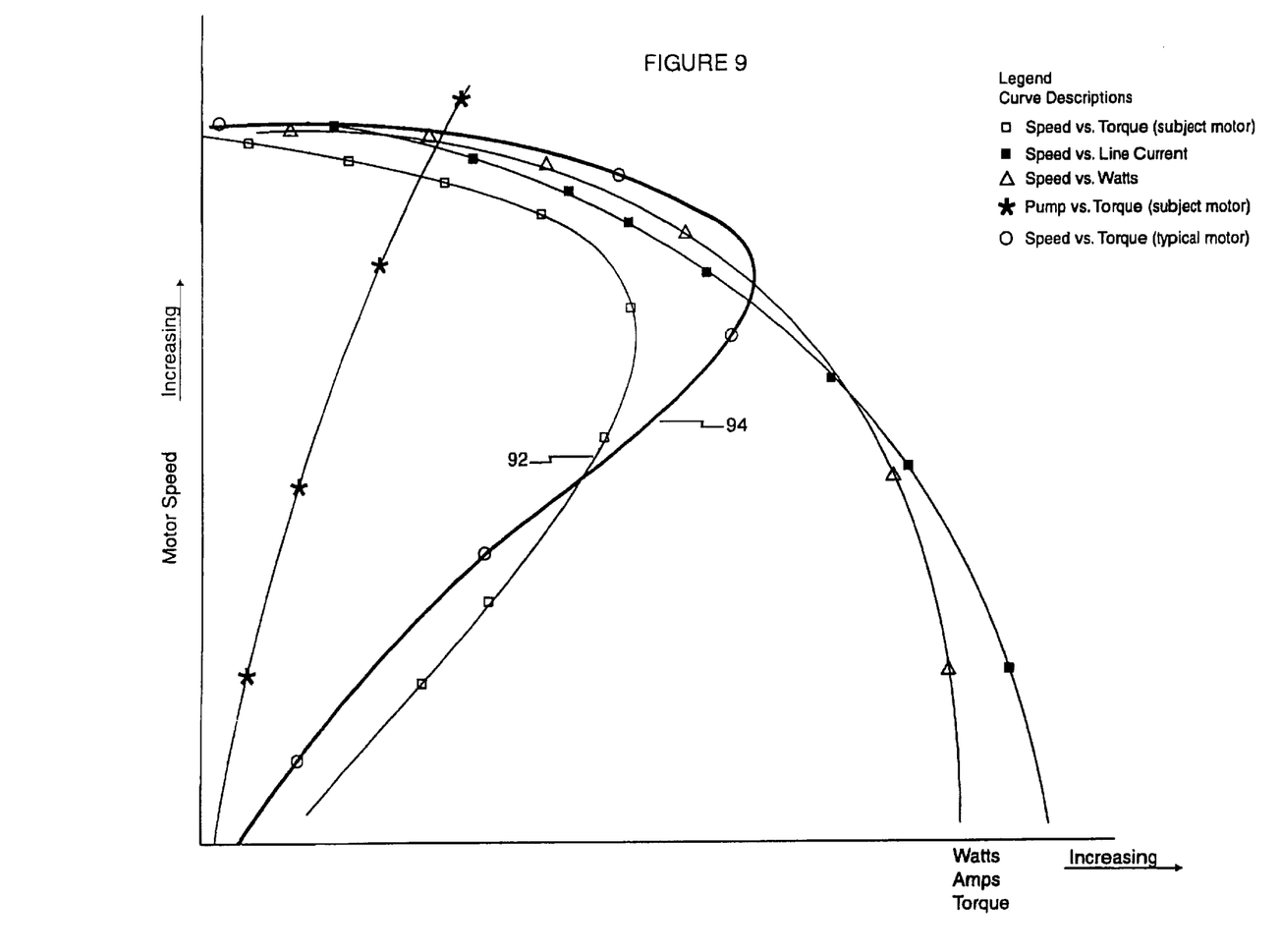
FIG. 9 is a graph showing the motor speed/torque curves for the motor shown in FIG. 8 and a prior art motor.

The above design alters the motor speed torque curve. Line 92 in FIG. 9 shows the motor speed torque curve of the motor in accordance with the present invention, and line 94 shows that of a typical motor.

When a source of variable phase angle voltage is applied to the PSC motor windings with phase capacitor installed as shown in FIG. 3, the motor speed is also varied. However, while the motor speed and corresponding mechanical load are reduced, electrical losses in the motor increase. Additionally, the fan output is also lowered due to the reduced shaft speed.

In order to help to overcome lowering of the fan output, as shown in FIG. 8, it is preferable to provide a second fan 86 onto the motor drive shaft 82 in addition to the first fan 85. The first fan 85 and the second fan 86 are provided at the opposite sides of the laminations 81. The first fan 85 acts as an exhaust fan and the second fan 86 acts as an intake fan. Exhaust vent slots may be provided in the motor frame on its first fan end to allow fan-forced air to exit the motor.

Figure 10:
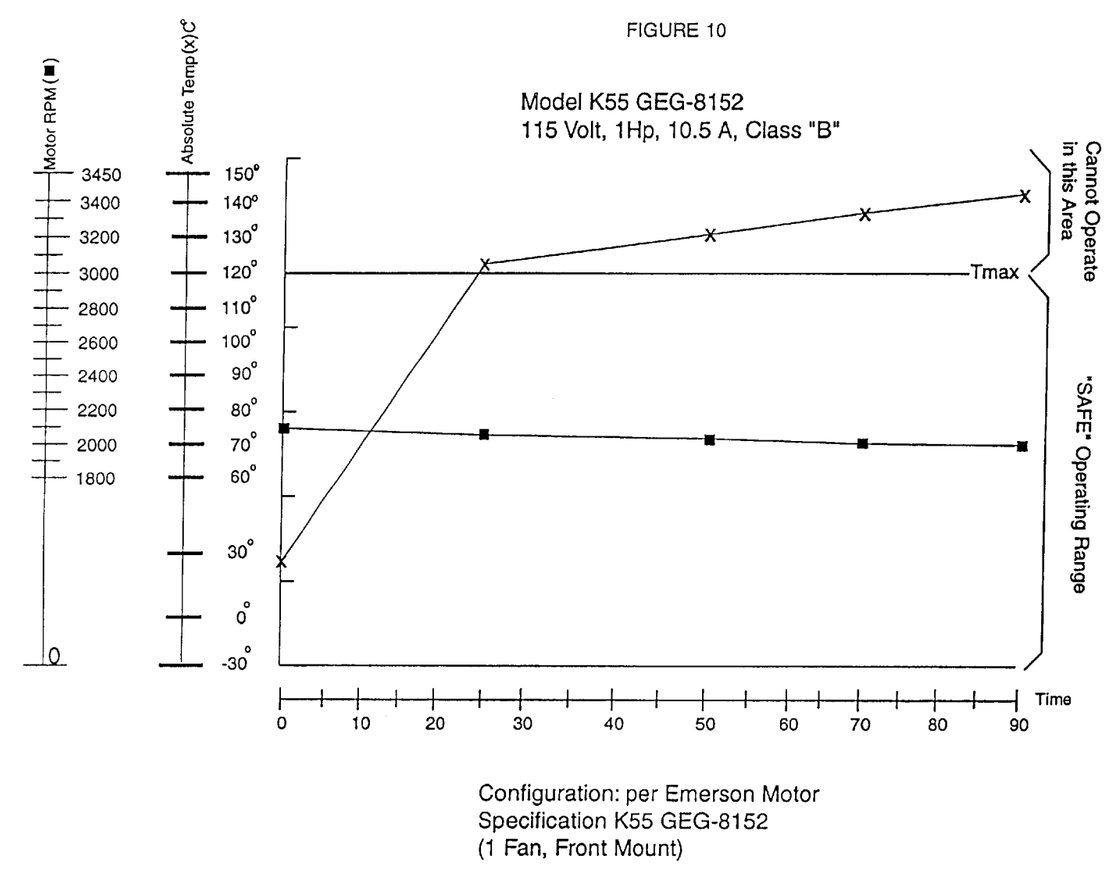
FIG. 10 is a graph showing the motor temperature/operation time for the above embodiment of the motor.
Figure 11:
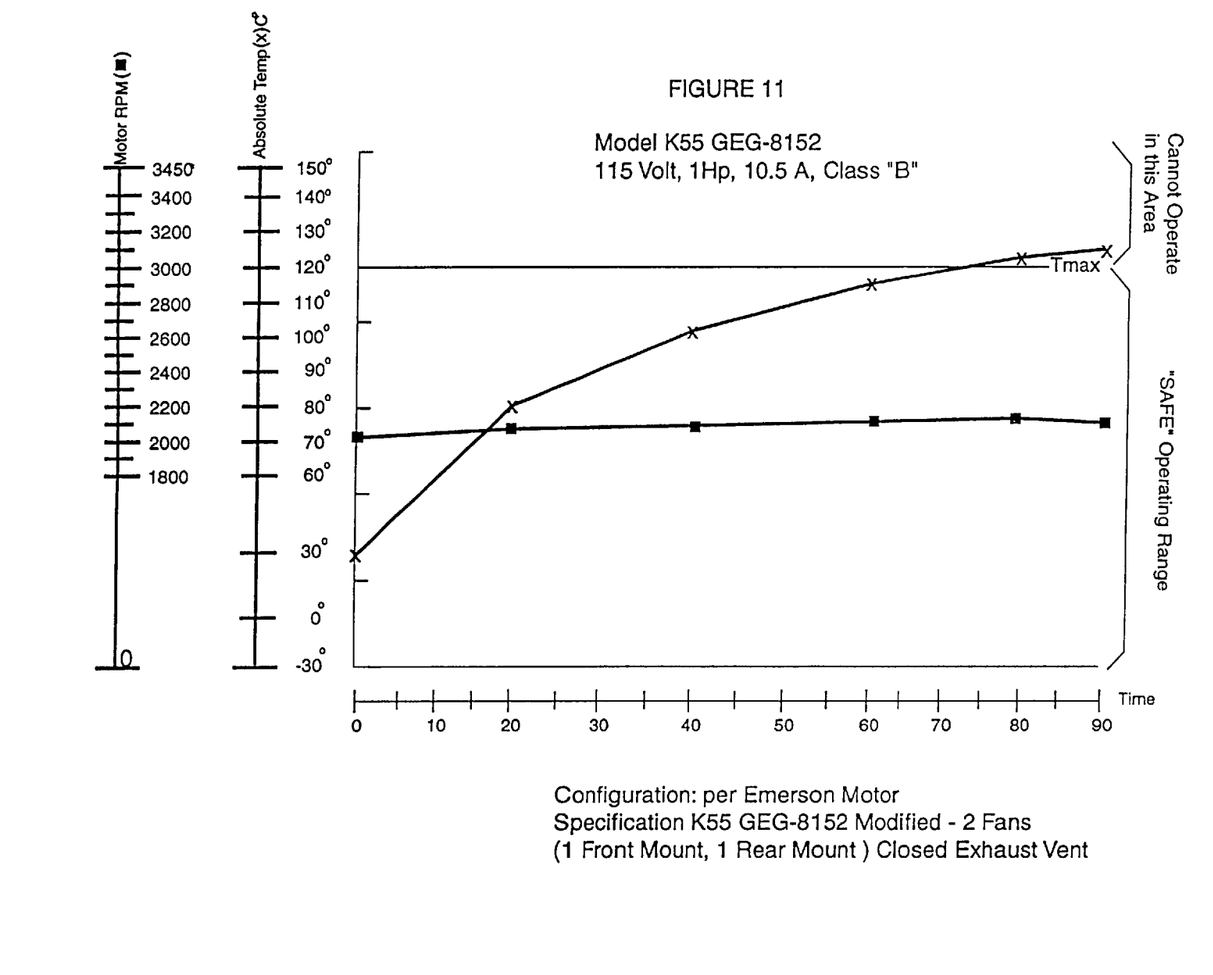
FIG. 11 is a graph showing the motor temperature/operation time for another embodiment of the motor.
Figure 12:
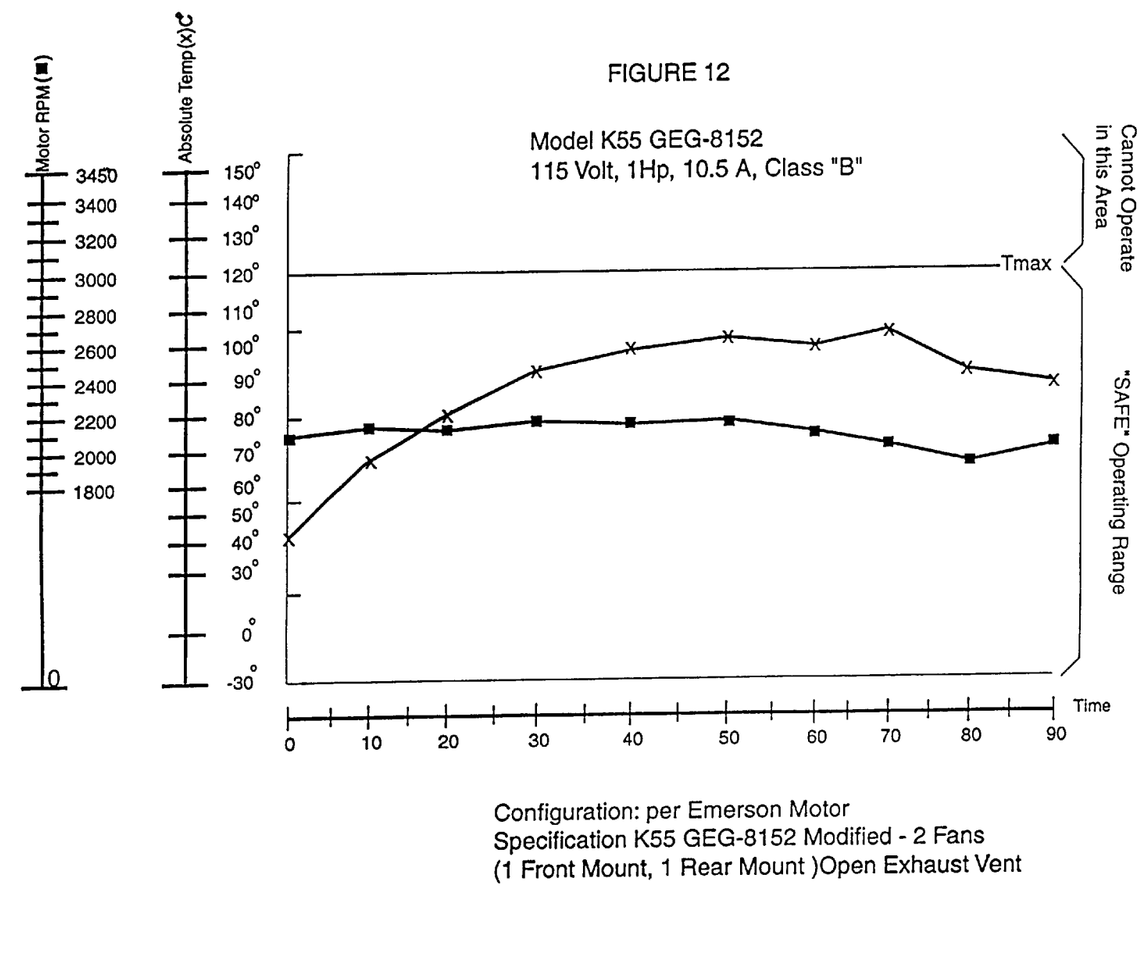
FIG. 12 is a graph showing the motor temperature/operation time for another embodiment of the motor.

FIG. 10 shows the motor temperature/operation time curve for a motor with only the first fan provided. The motor temperature exceeds the safe operating range in about 25 minutes. By contrast, FIGS. 11 and 12 show the motor temperature/operation time curve when the second fan is provided in addition to the first fan. The motor temperature stays within the safe operating range for over 70 minutes when the exhaust vent is closed as shown in FIG. 11; and it does not exceed the safe operating range after 90 minutes operation when the exhaust vent is open as shown in FIG. 12.

Numerous modifications, variations and adaptations may be made to the particular embodiments of the invention described above without departing from the scope of the invention, which is defined in the claims.

What is claimed is:

1. An apparatus operable in a wet environment for controlling speed of an induction motor adapted to be coupled to an AC source for supplying an AC signal, comprising:

a switching device coupled to the motor, the switching device being operative in either a first state wherein significant current flow through the motor is prevented or a second state wherein current flow through the motor is substantially undisturbed;

user controls for providing motor speed input signals;

controller means for receiving the motor speed input signals from the user controls and for switching the switching device between its first and second states in a predetermined sequence for inducing a phase angle delay in the AC signal; and isolation means for electrically isolating the user controls from the AC source, wherein the isolation means includes coupling means for optically coupling the switching device to the controller means.

2. An apparatus as defined in claim 1, wherein the current through the motor is controlled by:

(a) at a zero-crossing point of the positive half cycle of the AC signal, switching the switching device to its first state;

(b) generating a first delay;

(c) after the first delay, switching the switching device to its second state;

(d) at a zero-crossing point of the negative half cycle of the AC signal, switching the switching device to its first state;

(e) generating a second delay;

(f) after the second delay, switching the switching device to its second state.

3. An apparatus as defined in claim 1, wherein the isolation means includes a step-down transformer for receiving the AC signal and providing a stepped down signal to the controller means.

4. An apparatus as defined in claim 1, wherein the switching device includes a thyristor arrangement.

5. An apparatus as defined in claim 1, wherein the coupling means includes an optically coupled receiver and AC source zero crossing detector, and an optically coupled triac driver.

6. An apparatus operable in a wet environment for controlling speed of an induction motor adapted to be coupled to an AC source for supplying an AC signal, comprising:

a switching device connected in series with the motor, the switching device being operative in either a high impedance state wherein significant current flow through the motor is prevented or a low impedance state wherein current flow through the motor is substantially undisturbed;

user controls for providing motor speed input signals;

controller means for receiving the motor speed input signals from the user controls, and for switching the switching device between its low and high impedance states in a predetermined sequence for inducing a phase angle delay in the AC signal; and isolation means for electrically isolating the controller means from the AC source, wherein the isolation means includes coupling means for optically coupling the switching device to the controller means.

7. An apparatus as defined in claim 6, wherein the isolation means includes a step-down transformer for receiving the AC signal and providing a stepped down signal to the controller means.

8. An apparatus as defined in claim 6, wherein the switching device includes a triac.

9. An apparatus as defined in claim 6, wherein the coupling means includes an optically coupled receiver and AC source zero crossing detector, and an optically coupled triac driver.

10. An apparatus as defined in claim 6, wherein the current through the motor is controlled by:

(a) at a zero-crossing point of the positive half cycle of the AC signal, switching the switching device to its high impedance state;

(b) generating a first delay;

(c) after the first delay, switching the switching device to its low impedance state;

(d) at a zero-crossing point of the negative half cycle of the AC signal, switching the switching device to its high impedance state;

(e) generating a second delay;

(f) after the second delay, switching the switching device to its low impedance state.

11. A method of controlling the speed of an induction motor in a wet environment adapted to be coupled to an AC source for supplying an AC signal, and comprising:

a switching device coupled to the motor, the switching device being operative in either a first state wherein significant current flow through the motor is prevented or a second state wherein current flow through the motor is substantially undisturbed;

user controls for providing motor speed input signals;

controller means for receiving the motor speed input signals from the user controls, and for switching the switching device between its first and second states in a predetermined sequence for inducing a phase angle delay in the AC signal; and isolation means for electrically isolating the user controls from the AC source, wherein the isolation means includes coupling means for optically coupling the switching device to the controller means;

the method comprising the steps of:

(a) at a zero-crossing point of the positive half cycle of the AC signal, switching the switching device to its first state;

(b) generating a first delay;

(c) after the first delay, switching the switching device to its second state;

(d) at a zero-crossing point of the negative half cycle of the AC signal, switching the switching device to its first state;

(e) generating a second delay;

(f) after the second delay, switching the switching device to its second state.

12. A method of controlling the speed of an induction motor adapted to be coupled to an AC source for supplying an AC signal, and comprising:

a switching device connected in series with the motor, the switching device being operative in either a high impedance state wherein significant current flow through the motor is prevented or a low impedance state wherein current flow through the motor is substantially undisturbed;

user controls for providing motor speed input signal;

controller means for receiving the motor speed input signals from the user controls, and for switching the switching device between its low and high impedance states in a predetermined sequence for inducing a phase angle delay in the AC signal; and isolation means for electronically isolating the controller means from the AC source, wherein the isolation means includes coupling means for optically coupling the switching device to the controller means;

the method comprising the steps of:
(a) at a zero-crossing point of the positive half cycle of the AC signal, switching the switching device to its high impedance state;
(b) generating a first delay;
(c) after the first delay, switching the switching device to its low impedance state;
(d) at a zero-crossing point of the negative half cycle of the AC signal, switching the switching device to its high impedance state;
(e) generating a second delay;
(f) after the second delay, switching the switching device to its low impedance state.

13. An induction motor adapted to be coupled to an AC source and a motor controlling apparatus for controlling the motor speed by varying voltage phases supplied to the motor from the AC source, the motor comprising:

a motor drive shaft;

a rotor mounted on the motor drive shaft, the rotor having rotor laminations on its outer surface, the rotor laminations having a plurality of conductor bar slots and having a reflected rotor resistance over reflected rotor reactance ratio that is greater than one;

conductor bars accommodated in the conductor bar slots;

end rings for short-circuiting the conductor bars to form a rotor winding;

stator windings adapted for providing rotational forces to the rotor in cooperation with the rotor winding; and a stator for supporting the stator windings.

14. The induction motor as claimed in claim 13, wherein the total area of the conductor bar slots is adjusted to make the reflected rotor resistance over reflected rotor reactance ratio to be greater than one.

15. The induction motor as claimed in claim 14, wherein the end rings have resistance is adjusted to make the reflected rotor resistance over reflected rotor reactance ratio to be greater than one.

16. The induction motor as claimed in claim 13 further comprising:

an intake fan provided on the motor drive shaft adjacent to one of the end rings of the motor; and an exhaust fan provided on the motor drive shaft adjacent to the other one of the end rings of the motor.

17. An induction motor system operable in a wet environment, the system comprising: an induction motor adapted to be coupled to an AC source for supplying an AC signal, the motor having:

a motor drive shaft;

a rotor mounted on the motor drive shaft, the rotor having rotor laminations on its outer surface, the rotor laminations having a plurality of conductor bar slots and having a reflected rotor resistance over reflected rotor reactance ratio that is greater than one;

conductor bars accommodated in the conductor bar slots;

end rings for short-circuiting the conductor bars to form a rotor winding;

stator windings adapted for providing rotational forces to the rotor in cooperation with the rotor winding; and a stator for supporting the stator windings; and a motor controlling apparatus for controlling the speed of the motor, the controlling apparatus having:

a switching device coupled to the motor, the switching device being operative in either a first state wherein significant current flow through the motor is prevented or a second state wherein current flow through the motor is substantially undisturbed;

user controls for providing motor speed input signals;

controller means for receiving the motor speed input signals from the user controls, and for switching the switching device between its first and second states in a predetermined sequence for inducing a phase angle delay in the AC signal; and isolation means for electrically isolating the user controls from the AC source, the isolation means including coupling means for optically coupling the switching device to the controller means.

18. An induction motor system as defined in claim 17, wherein the isolation means includes a step-down transformer for receiving the AC signal and providing a stepped down signal to the controller means.

19. An induction motor system as defined in claim 17, wherein the switching device includes a thyristor arrangement.

20. An induction motor system as defined in claim 17, wherein the coupling means includes an optically coupled receiver and AC source zero crossing detector, and an optically coupled triac driver.

21. The induction motor system as claimed in claim 17, wherein the total area of the conductor bar slots is adjusted to make the reflected rotor resistance over reflected rotor reactance ratio to be greater than one.

22. The induction motor system as claimed in claim 21, wherein the end rings have resistance is adjusted to make the reflected rotor resistance over reflected rotor reactance ratio to be greater than one.

23. The induction motor system as claimed in claim 17 further comprising:

an intake fan provided on the motor drive shaft adjacent to one of the end rings of the motor; and an exhaust fan provided on the motor drive shaft adjacent to the other one of the end rings of the motor.

* * * * *